(12) United States Patent
Lyu

(10) Patent No.: US 10,971,816 B2
(45) Date of Patent: Apr. 6, 2021

(54) PHASE ADJUSTMENT METHOD AND APPARATUS FOR ANTENNA ARRAY

(71) Applicant: Huawei Technologies Co., Ltd., Shenzhen (CN)

(72) Inventor: Rui Lyu, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 434 days.

(21) Appl. No.: 16/054,057

(22) Filed: Aug. 3, 2018

(65) Prior Publication Data

US 2018/0342802 A1   Nov. 29, 2018

Related U.S. Application Data

(63) Continuation of application No. PCT/CN2016/073547, filed on Feb. 4, 2016.

(51) Int. Cl.
| | |
|---|---|
| *H01Q 3/26* | (2006.01) |
| *H04B 7/06* | (2006.01) |
| *H04B 17/12* | (2015.01) |
| *H04B 17/21* | (2015.01) |
| *H01Q 3/38* | (2006.01) |
| *H04B 7/04* | (2017.01) |

(52) U.S. Cl.
CPC .............. *H01Q 3/267* (2013.01); *H01Q 3/38* (2013.01); *H04B 7/04* (2013.01); *H04B 7/0615* (2013.01); *H04B 17/12* (2015.01); *H04B 17/21* (2015.01)

(58) Field of Classification Search
CPC .......... H01Q 3/267; H01Q 3/38; H04B 17/12; H04B 17/21; H04B 7/04; H04B 7/0615
See application file for complete search history.

(56) References Cited

U.S. PATENT DOCUMENTS

| | | | |
|---|---|---|---|
| 5,422,637 A | 6/1995 | Sezai | |
| 6,999,794 B1 | 2/2006 | Lindskog et al. | |
| 7,593,826 B2* | 9/2009 | Weese | H01Q 3/267 |
| | | | 702/106 |
| 2002/0080743 A1 | 6/2002 | Morita et al. | |
| 2004/0127260 A1 | 7/2004 | Boros et al. | |
| 2004/0266483 A1 | 12/2004 | Choi | |

(Continued)

FOREIGN PATENT DOCUMENTS

| | | |
|---|---|---|
| CN | 101180551 A | 5/2008 |
| CN | 101588198 A | 11/2009 |

(Continued)

*Primary Examiner* — Cassi J Galt
(74) *Attorney, Agent, or Firm* — Slater Matsil, LLP

(57) ABSTRACT

The present application discloses a phase adjustment method and apparatus for an antenna array. The method includes: dividing the antenna array into a first antenna subarray and a second antenna subarray according to a first division rule in a preset division rule set; obtaining a phase difference between a first aggregated signal corresponding to the first antenna subarray and a second aggregated signal corresponding to the second antenna subarray; determining a to-be-adjusted phase value of each antenna array element in the antenna array according to the phase difference and a first weighting rule; and sending, to a phase shifter corresponding to each antenna array element, the to-be-adjusted phase value corresponding to the antenna array element.

20 Claims, 3 Drawing Sheets

(56) References Cited

U.S. PATENT DOCUMENTS

2006/0044185 A1     3/2006   Jin et al.
2006/0273959 A1   12/2006   Kawasaki

FOREIGN PATENT DOCUMENTS

| CN | 102738551 | 10/2012 |
|---|---|---|
| EP | 2173005 A1 | 4/2010 |
| EP | 2975781 A1 | 1/2016 |

* cited by examiner

PHASE ADJUSTMENT METHOD AND APPARATUS FOR ANTENNA ARRAY

CROSS-REFERENCE TO RELATED APPLICATIONS

This application is a continuation of International Application No. PCT/CN2016/073547, filed on Feb. 4, 2016, the disclosure of which is hereby incorporated by reference in its entirety.

TECHNICAL FIELD

The present application relates to the field of communications technologies, and in particular, to a phase adjustment method and apparatus for an antenna array.

BACKGROUND

In a microwave system that includes an antenna array, each antenna array element in the antenna array corresponds to one phase shifter whose phase shift angle can be adjusted. A phase of a transmitted or received signal on each antenna array element may be independently changed by adjusting the phase shifter. In actual application, a phase of an antenna array element in an antenna array is changed by adjusting a phase shifter, so that transmitted or received signals are coherently combined in an expected beam direction, so as to maximize a transmit gain or a receive gain of the antenna array in the expected beam direction.

For example, as shown in FIG. 1, in an antenna array that includes four antenna array elements, each antenna array element corresponds to one signal channel, and current phases of phase shifters corresponding to all the antenna array elements are respectively $\Psi 1$, $\Psi 2$, $\Psi 3$, and $\Psi 4$. When an expected beam direction is at $\theta$, spatial channel phases that are obtained through estimation and that correspond to all the antenna array elements are $\varphi 1$, $\varphi 2$, $\varphi 3$, and $\varphi 4$. In this case, after signals transmitted by the four antenna array elements are propagated through spatial channels, phases that are obtained through estimation and that are of the signals that arrive at a receive end are $P1=\Psi 1+\varphi 1$, $P2=\Psi 2+\varphi 2$, $P3=\Psi 3+\varphi 3$, and $P4=\Psi 4+\varphi 4$. To maximize a transmit gain of the antenna array in the expected beam direction by ensuring phase alignment for the antenna array elements in the antenna array at the receive end, the phases of the phase shifters need to be adjusted, so that $P1=P2=P3=P4$.

Currently, a commonly used phase adjustment method is as follows. A spatial channel phase corresponding to each antenna array element is estimated according to an expected beam direction. The spatial channel phase obtained through estimation and a current phase value of a phase shifter corresponding to the antenna array element are added to obtain a final phase of a transmitted signal or a received signal corresponding to the antenna array element. The phase value of the phase shifter corresponding to the antenna array element is adjusted, so that a final phase value corresponding to the antenna array element reaches a target phase value, so as to implement phase alignment.

However, in the phase adjustment method currently used, phase adjustments need to be performed on all antenna array elements one by one, and when a phase adjustment is performed on a single antenna array element, only the antenna array element is in an active state, and other antenna array elements cannot work. Consequently, a loss to an array gain of an antenna array is caused, and accordingly the antenna array has relatively low working efficiency.

SUMMARY

The present application provides a phase adjustment method and apparatus for an antenna array, so as to resolve the following problem existing in the prior art: An antenna array has relatively low working efficiency when a phase adjustment is performed.

To achieve the foregoing objective, the following technical solutions are used in embodiments of the present invention.

According to a first aspect, an embodiment of the present invention provides a phase adjustment method for an antenna array. The method includes dividing the antenna array into a first antenna subarray and a second antenna subarray according to a first division rule in a preset division rule set. The preset division rule set includes at least M−1 division rules, a value of M is a quantity of antenna array elements in the antenna array, and an antenna array element in the antenna array belongs to the first antenna subarray or the second antenna subarray. The method also includes obtaining a phase difference between a first aggregated signal corresponding to the first antenna subarray and a second aggregated signal corresponding to the second antenna subarray. The method also includes determining a to-be-adjusted phase value of each antenna array element in the antenna array according to the phase difference and a first weighting rule, where the first weighting rule is a weighting rule that is corresponding to the first division rule and that is in a preset weighting rule set. The method also includes sending, to a phase shifter corresponding to each antenna array element, the to-be-adjusted phase value corresponding to the antenna array element. The first aggregated signal is a signal obtained by superposing signals that are transmitted by antenna array elements in the first antenna subarray and that are propagated through spatial channels, and the second aggregated signal is a signal obtained by superposing signals that are transmitted by antenna array elements in the second antenna subarray and that are propagated through spatial channels; or the first aggregated signal is a signal obtained by superposing signals received by antenna array elements in the first antenna subarray, and the second aggregated signal is a signal obtained by superposing signals received by antenna array elements in the second antenna subarray.

After the foregoing technical solutions are used, an entire antenna array is divided into two antenna subarrays according to a specific division rule, a phase difference between aggregated signals corresponding to the two antenna subarrays is obtained, and then a to-be-adjusted phase value for a phase shifter corresponding to each antenna array element is determined according to the obtained phase difference and a weighting rule corresponding to the division rule, and is sent to the phase shifter corresponding to each antenna array element to implement a phase adjustment. In comparison with the currently used method, according to the phase adjustment method provided in this embodiment of the present invention, in a whole phase adjustment process, all antenna array elements in the antenna array can be in an active state, and the antenna array can normally work, so that working efficiency of the antenna array can be improved.

With reference to the first aspect, in a first implementation of the first aspect, after the sending, to a phase shifter corresponding to each antenna array element, the to-be-adjusted phase value corresponding to the antenna array element, the method further includes: separately obtaining signal power corresponding to the antenna array before a phase adjustment and signal power corresponding to the antenna array after the phase adjustment; determining a signal power difference according to the signal power corresponding to the antenna array after the phase adjustment and the signal power corresponding to the antenna array before the phase adjustment; and if the signal power difference is greater than a preset threshold, performing the step of dividing the antenna array into a first antenna subarray and a second antenna subarray according to a first division rule in a preset division rule set and subsequent steps, so as to perform a next phase adjustment on the antenna array element in the antenna array. In this implementation, after one phase adjustment, a signal power increased value corresponding to the antenna array is obtained. If the increased value is less than the preset threshold, it may be considered that an effect brought by performing a phase adjustment again is relatively small, and there is no need to perform an adjustment again. Otherwise, if the increased value is not less than the preset threshold, it may be considered that the next phase adjustment may be performed to further increase the signal power corresponding to the antenna array, to implement phase alignment.

With reference to the first aspect, in a second implementation of the first aspect, after the sending, to a phase shifter corresponding to each antenna array element, the to-be-adjusted phase value corresponding to the antenna array element, the method further includes: counting a quantity of adjustments to obtain a counting result; and if the counting result does not reach a preset threshold, performing the step of dividing the antenna array into a first antenna subarray and a second antenna subarray according to a first division rule in a preset division rule set and subsequent steps, so as to perform a next phase adjustment on the antenna array element in the antenna array. In this implementation, a threshold that is of the quantity of adjustments and that is used to determine whether phase alignment is implemented may be predetermined, and whether the next phase adjustment needs to be performed is determined by determining whether the quantity of adjustments reaches the preset threshold of the quantity of adjustments.

With reference to any one of the first aspect, or the first or the second implementation of the first aspect, in a third implementation of the first aspect, before the dividing the antenna array into a first antenna subarray and a second antenna subarray according to a first division rule in a preset division rule set, the method further includes: constructing a division matrix $A_{ij}$. The division matrix includes at least M−1 rows and M columns, a value of an element in each row of the division matrix is a first value or a second value, and there is a preset correspondence between each antenna array element and the element in each row of the division matrix. The method also includes determining a division rule according to the value of the element in each row of the division matrix. Each row corresponds to one division rule, and the division rule is that an antenna array element corresponding to an element whose value is the first value is grouped into the first antenna subarray, and that an antenna array element corresponding to an element whose value is the second value is grouped into the second antenna subarray. A possible design rule of the division rule is provided in this implementation.

With reference to the third implementation of the first aspect, in a fourth implementation of the first aspect, the division matrix $A_{ij}$ is a full rank matrix that includes M−1 rows and M columns and whose element value is merely 0 or 1, the preset correspondence is that a preset number m of each antenna array element corresponds to a column number j of the division matrix $A_{ij}$, and the division rule is that an antenna array element indicated by a number m corresponding to a column number j of an element whose value is 0 in each row is grouped into the first antenna subarray, and that an antenna array element indicated by a number m corresponding to a column number j of an element whose value is 1 in each row is grouped into the second antenna subarray. In this implementation, a possible implementation of the division rule is provided in the foregoing possible design rule.

With reference to the third implementation of the first aspect, in a fifth implementation of the first aspect, before the dividing the antenna array into a first antenna subarray and a second antenna subarray according to a first division rule in a preset division rule set, the method further includes: determining a weighted difference matrix B according to the division matrix $A_{ij}$ and a complementary matrix $A_{ij}\sim$ of the division matrix $A_{ij}$; and determining a weighted matrix $G_{ji}$ according to the weighted difference matrix B. In this implementation, a possible design rule of a weighting rule corresponding to the division rule is provided.

With reference to the fifth implementation of the first aspect, in a sixth implementation of the first aspect, the determining a weighted difference matrix B according to the division matrix $A_{ij}$ and a complementary matrix $A_{ij}\sim$ of the division matrix $A_{ij}$ includes: determining the weighted difference matrix B according to the division matrix $A_{ij}$, the complementary matrix $A_{ij}\sim$ of the division matrix $A_{ij}$, and a formula $B=S*A_{ij}-T*A_{ij}\sim$, where S is an energy normalization weighted value of the division matrix $A_{ij}$, T is an energy normalization weighted value of the complementary matrix $A_{ij}\sim$, and the weighted difference matrix B is a matrix with M−1 rows and M columns; and the determining a weighted matrix $G_{ji}$ according to the weighted difference matrix B includes: deleting a first column of the weighted difference matrix B to obtain a residual weighted difference matrix $B_R$; determining the weighted matrix $G_{ji}$ according to an inverse matrix $B_R\sim$ of the residual weighted difference matrix $B_R$, a preset vector V, and a formula $$G_{ji} = \begin{bmatrix} V \\ B_R \sim \end{bmatrix},$$

where the preset vector V is a row vector that includes M−1 elements and that is orthogonal to each column vector of the residual weighted difference matrix $B_R$, and the weighted matrix $G_{ji}$ is a matrix that includes M rows and M−1 columns; and determining a weighting rule according to a value of an element in each column of the weighted matrix $G_{ji}$ and a number of the antenna array element, where the weighting rule is that a product of the phase difference $\Delta P_A$ and a value of each element in each column of the matrix $G_{ji}$ is used as a to-be-adjusted phase value of an antenna array element indicated by a number m corresponding to a row number j of the element, where a division rule corresponding to a $j^{th}$ row of the division matrix is corresponding to a weighting rule corresponding to a $j^{th}$ column of the weighted matrix $G_{ji}$, and a value of j is a positive integer from 1 to M−1. A specific implementation of the weighting rule is provided in this implementation.

With reference to any one of the first aspect, or the first, the second, the third, the fourth, the fifth, or the sixth implementation of the first aspect, in a seventh implementation of the first aspect, the obtaining signal power corresponding to the antenna array after the phase adjustment includes: activating all antenna array elements in the antenna array; transmitting signals using the antenna array; and obtaining signal power of an aggregated signal obtained by superposing the signals that are transmitted by the antenna array and that are propagated through spatial channels; or obtaining signal power of an aggregated signal obtained by superposing signals received by all the antenna array elements in the antenna array.

According to a second aspect, an embodiment of the present invention provides a phase adjustment apparatus for an antenna array. The apparatus includes a processing unit, configured to: divide the antenna array into a first antenna subarray and a second antenna subarray according to a first division rule in a preset division rule set. The preset division rule set includes at least M−1 division rules, a value of M is a quantity of antenna array elements in the antenna array, and an antenna array element in the antenna array belongs to the first antenna subarray or the second antenna subarray. The processing unit is also configured to obtain a phase difference between a first aggregated signal corresponding to the first antenna subarray and a second aggregated signal corresponding to the second antenna subarray. The processing unit is also configured to determine a to-be-adjusted phase value of each antenna array element in the antenna array according to the phase difference and a first weighting rule, where the first weighting rule is a weighting rule that is corresponding to the first division rule and that is in a preset weighting rule set. The apparatus also includes a sending unit, configured to send, to a phase shifter corresponding to each antenna array element, the to-be-adjusted phase value corresponding to the antenna array element. The first aggregated signal is a signal obtained by superposing signals that are transmitted by antenna array elements in the first antenna subarray and that are propagated through spatial channels, and the second aggregated signal is a signal obtained by superposing signals that are transmitted by antenna array elements in the second antenna subarray and that are propagated through spatial channels; or the first aggregated signal is a signal obtained by superposing signals received by antenna array elements in the first antenna subarray, and the second aggregated signal is a signal obtained by superposing signals received by antenna array elements in the second antenna subarray.

With reference to the second aspect, in a first implementation of the second aspect, the processing unit is further configured to: separately obtain signal power corresponding to the antenna array before a phase adjustment and signal power corresponding to the antenna array after the phase adjustment; determine a signal power difference according to the signal power corresponding to the antenna array after the phase adjustment and the signal power corresponding to the antenna array before the phase adjustment; and when the signal power difference is greater than a preset threshold, perform the step of dividing the antenna array into a first antenna subarray and a second antenna subarray according to a first division rule in a preset division rule set and subsequent steps, so as to perform a next phase adjustment on the antenna array element in the antenna array.

With reference to the second aspect, in a second implementation of the second aspect, the processing unit is further configured to: count a quantity of adjustments to obtain a counting result; and if the counting result does not reach a preset threshold, perform the step of dividing the antenna array into a first antenna subarray and a second antenna subarray according to a first division rule in a preset division rule set and subsequent steps, so as to perform a next phase adjustment on the antenna array element in the antenna array.

With reference to any one of the second aspect, or the first or the second implementation of the second aspect, in a third implementation of the second aspect, the processing unit is further configured to: construct a division matrix $A_{ij}$, where the division matrix includes at least M−1 rows and M columns, a value of an element in each row of the division matrix is a first value or a second value, and there is a preset correspondence between each antenna array element and the element in each row of the division matrix; and determine a division rule according to the value of the element in each row of the division matrix, where each row is corresponding to one division rule, and the division rule is that an antenna array element corresponding to an element whose value is the first value is grouped into the first antenna subarray, and that an antenna array element corresponding to an element whose value is the second value is grouped into the second antenna subarray.

With reference to the third implementation of the second aspect, in a fourth implementation of the second aspect, the division matrix $A_{ij}$ constructed by the processing unit is a full rank matrix that includes M−1 rows and M columns and whose element value is merely 0 or 1, the preset correspondence is that a preset number m of each antenna array element is corresponding to a column number j of the division matrix $A_{ij}$, and the division rule is that an antenna array element indicated by a number m corresponding to a column number j of an element whose value is 0 in each row is grouped into the first antenna subarray, and that an antenna array element indicated by a number m corresponding to a column number j of an element whose value is 1 in each row is grouped into the second antenna subarray.

With reference to the third implementation of the second aspect, in a fifth implementation of the second aspect, the processing unit is further configured to: determine a weighted difference matrix B according to the division matrix $A_{ij}$ and a complementary matrix $A_{ij}\sim$ of the division matrix $A_{ij}$; and determine a weighted matrix $G_{ji}$ according to the weighted difference matrix B.

With reference to the fifth implementation of the second aspect, in a sixth implementation of the second aspect, the processing unit is configured to: determine the weighted difference matrix B according to the division matrix $A_{ij}$, the complementary matrix $A_{ij}\sim$ of the division matrix $A_{ij}$, and a formula $B=S*A_{ij}-T*A_{ij}\sim$, where S is an energy normalization weighted value of the division matrix $A_{ij}$, T is an energy normalization weighted value of the complementary matrix $A_{ij}\sim$, and the weighted difference matrix B is a matrix with M−1 rows and M columns; delete a first column of the weighted difference matrix B to obtain a residual weighted difference matrix $B_R$; determine the weighted matrix $G_{ji}$ according to an inverse matrix $B_R\sim$ of the residual weighted difference matrix $B_R$, a preset vector V, and a formula $$G_{ji} = \begin{bmatrix} V \\ B_R \sim \end{bmatrix},$$

where the preset vector V is a row vector that includes M−1 elements and that is orthogonal to each column vector of the residual weighted difference matrix $B_R$, and the weighted matrix $G_{ji}$ is a matrix that includes M rows and M−1 columns; and determine a weighting rule according to a value of an element in each column of the weighted matrix $G_{ji}$ and a number of the antenna array element, where the weighting rule is that a product of the phase difference $\Delta P_A$ and a value of each element in each column of the matrix $G_{ji}$ is used as a to-be-adjusted phase value of an antenna array element indicated by a number m corresponding to a row number j of the element, where a division rule corresponding to a $j^{th}$ row of the division matrix is corresponding to a weighting rule corresponding to a $j^{th}$ column of the weighted matrix $G_{ji}$, and a value of j is a positive integer from 1 to M−1.

With reference to any one of the second aspect, or the first implementation, the second implementation, the third implementation, the fourth implementation, the fifth implementation, or the sixth implementation of the second aspect, in a seventh implementation of the second aspect, the processing unit is configured to: activate all antenna array elements in the antenna array; transmit signals by using the antenna array; and obtain signal power of an aggregated signal obtained by superposing the signals that are transmitted by the antenna array and that are propagated through spatial channels; or receive signal power of an aggregated signal obtained by superposing signals received by all the antenna array elements in the antenna array.

According to a third aspect, an embodiment of the present invention further provides a phase adjustment apparatus for an antenna array. The apparatus includes a processor, configured to: divide the antenna array into a first antenna subarray and a second antenna subarray according to a first division rule in a preset division rule set. The preset division rule set includes at least M−1 division rules, a value of M is a quantity of antenna array elements in the antenna array, and an antenna array element in the antenna array belongs to the first antenna subarray or the second antenna subarray. The processor is also configured to obtain a phase difference between a first aggregated signal corresponding to the first antenna subarray and a second aggregated signal corresponding to the second antenna subarray. The processor is also configured to determine a to-be-adjusted phase value of each antenna array element in the antenna array according to the phase difference and a first weighting rule, where the first weighting rule is a weighting rule that corresponds to the first division rule and that is in a preset weighting rule set. The processor is also configured to send, to a phase shifter corresponding to each antenna array element, the to-be-adjusted phase value corresponding to the antenna array element. The first aggregated signal is a signal obtained by superposing signals that are transmitted by antenna array elements in the first antenna subarray and that are propagated through spatial channels, and the second aggregated signal is a signal obtained by superposing signals that are transmitted by antenna array elements in the second antenna subarray and that are propagated through spatial channels; or the first aggregated signal is a signal obtained by superposing signals received by antenna array elements in the first antenna subarray, and the second aggregated signal is a signal obtained by superposing signals received by antenna array elements in the second antenna subarray.

With reference to the third aspect, in a first implementation of the third aspect, the processor is further configured to: separately obtain signal power corresponding to the antenna array before a phase adjustment and signal power corresponding to the antenna array after the phase adjustment; determine a signal power difference according to the signal power corresponding to the antenna array after the phase adjustment and the signal power corresponding to the antenna array before the phase adjustment; and if the signal power difference is greater than a preset threshold, perform the step of dividing the antenna array into a first antenna subarray and a second antenna subarray according to a first division rule in a preset division rule set and subsequent steps, so as to perform a next phase adjustment on the antenna array element in the antenna array.

With reference to the third aspect, in a second implementation of the third aspect, the processor is further configured to: count a quantity of adjustments to obtain a counting result; and if the counting result does not reach a preset threshold, perform the step of dividing the antenna array into a first antenna subarray and a second antenna subarray according to a first division rule in a preset division rule set and subsequent steps, so as to perform a next phase adjustment on the antenna array element in the antenna array.

With reference to any one of the third aspect, or the first or the second implementation of the third aspect, in a third implementation of the third aspect, the processor is further configured to: construct a division matrix $A_{ij}$. The division matrix includes at least M−1 rows and M columns, a value of an element in each row of the division matrix is a first value or a second value, and there is a preset correspondence between each antenna array element and the element in each row of the division matrix. The processor is also configured to determine a division rule according to the value of the element in each row of the division matrix, where each row is corresponding to one division rule, and the division rule is that an antenna array element corresponding to an element whose value is the first value is grouped into the first antenna subarray, and that an antenna array element corresponding to an element whose value is the second value is grouped into the second antenna subarray.

With reference to the third implementation of the third aspect, in a fourth implementation of the third aspect, the division matrix $A_{ij}$ constructed by the processor is a full rank matrix that includes M−1 rows and M columns and whose element value is merely 0 or 1. The preset correspondence is that a preset number m of each antenna array element is corresponding to a column number j of the division matrix $A_{ij}$, and the division rule is that an antenna array element indicated by a number m corresponding to a column number j of an element whose value is 0 in each row is grouped into the first antenna subarray, and that an antenna array element indicated by a number m corresponding to a column number j of an element whose value is 1 in each row is grouped into the second antenna subarray.

With reference to the third implementation of the third aspect, in a fifth implementation of the third aspect, the processor is further configured to: determine a weighted difference matrix B according to the division matrix $A_{ij}$ and a complementary matrix $A_{ij}$~ of the division matrix $A_{ij}$; and determine a weighted matrix $G_{ji}$ according to the weighted difference matrix B.

With reference to the fifth implementation of the third aspect, in a sixth implementation of the third aspect, the processor is configured to: determine the weighted difference matrix B according to the division matrix $A_{ij}$, the complementary matrix $A_{ij}$~ of the division matrix $A_{ij}$, and a formula $B=S*A_{ij}-T*A_{ij}$~, where S is an energy normalization weighted value of the division matrix $A_{ij}$, T is an energy normalization weighted value of the complementary matrix $A_{ij}$~, and the weighted difference matrix B is a matrix with M−1 rows and M columns. The processor is also configured to delete a first column of the weighted difference matrix B to obtain a residual weighted difference matrix $B_R$. The processor is also configured to determine the weighted matrix $G_{ji}$ according to an inverse matrix $B_R\sim$ of the residual weighted difference matrix $B_R$, a preset vector V, and a formula $$G_{ji} = \begin{bmatrix} V \\ B_R \sim \end{bmatrix},$$

where the preset vector V is a row vector that includes M−1 elements and that is orthogonal to each column vector of the residual weighted difference matrix $B_R$, and the weighted matrix $G_{ji}$ is a matrix that includes M rows and M−1 columns. The processor is also configured to determine a weighting rule according to a value of an element in each column of the weighted matrix $G_{ji}$ and a number of the antenna array element, where the weighting rule is that a product of the phase difference $\Delta P_A$ and a value of each element in each column of the matrix $G_{ji}$ is used as a to-be-adjusted phase value of an antenna array element indicated by a number m corresponding to a row number j of the element, where a division rule corresponding to a $j^{th}$ row of the division matrix is corresponding to a weighting rule corresponding to a $j^{th}$ column of the weighted matrix $G_{ji}$, and a value of j is a positive integer from 1 to M−1.

With reference to any one of the third aspect, or the first implementation, the second implementation, the third implementation, the fourth implementation, the fifth implementation, or the sixth implementation of the third aspect, in a seventh implementation of the third aspect, the processor is configured to: activate all antenna array elements in the antenna array; transmit signals by using the antenna array; and obtain signal power of an aggregated signal obtained by superposing the signals that are transmitted by the antenna array and that are propagated through spatial channels; or receive signal power of an aggregated signal obtained by superposing signals received by all the antenna array elements in the antenna array.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following describes the technical solutions in the embodiments with reference to the accompanying drawings in the embodiments. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
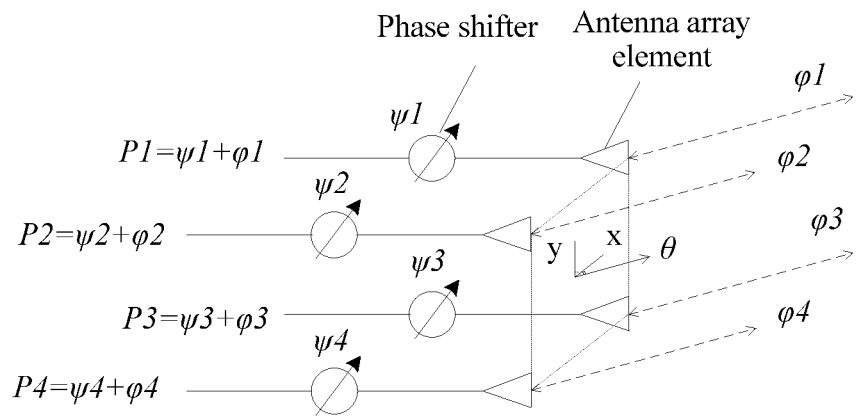
FIG. 1 is a schematic diagram of a phase alignment principle.
Figure 2:
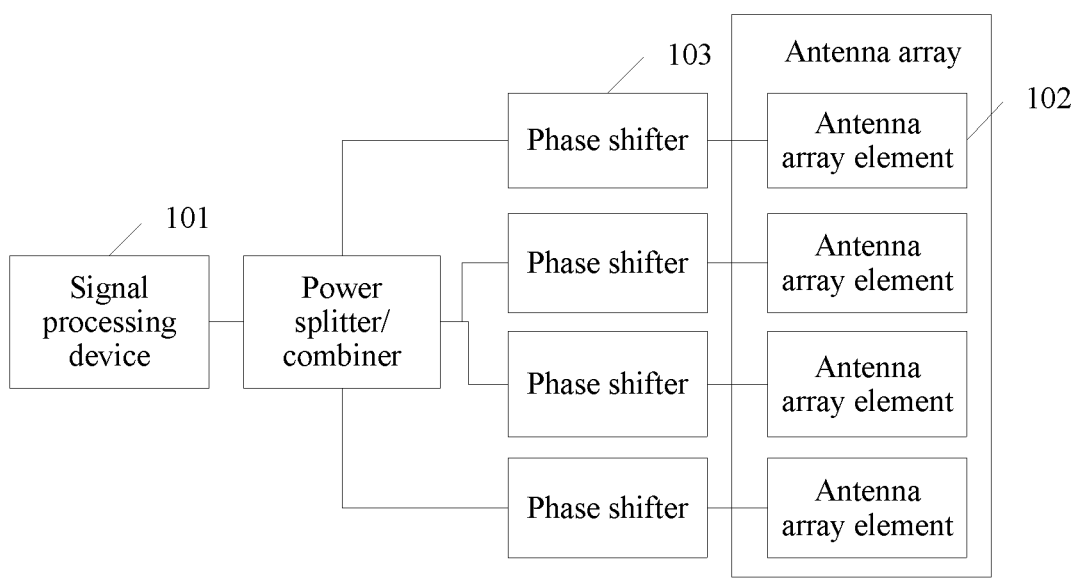
FIG. 2 is a schematic diagram of a phase adjustment system for an antenna array according to an embodiment of the present invention.

As shown in FIG. 2, an embodiment of the present invention provides a phase adjustment system for an antenna array. The system includes a signal processing device 101, an antenna array including a plurality of antenna array elements 102, and phase shifters 103 respectively corresponding to all the antenna array elements. The signal processing device 101 is configured to output an electrical signal to the phase shifter 103, so as to adjust a phase of the phase shifter, modulate or demodulate a signal, and the like. The signal processing device 101 usually includes any one of modules such as a DSP, an FPGA, and an ASIC. The antenna array element 102 is configured to receive or transmit a signal. The phase shifter 103 is configured to adjust a signal phase of the signal received or transmitted by the antenna array element. The phase shifter 103 may be an analog phase shifter, or may be a digital phase shifter. For a specific structure of the phase shifter 103, refer to the prior art. In addition, a power splitter and/or a combiner are/is shown in FIG. 2. When the antenna array is only configured to transmit a signal, the phase adjustment system for an antenna array further includes the power splitter. The power splitter is configured to split one signal into a plurality of signals. Then, after phases of the plurality of signals are separately adjusted by the phase shifters corresponding to all the antenna array elements, the plurality of signals are transmitted by the antenna array elements in the antenna array. When the antenna array is only configured to receive a signal, the phase adjustment system for an antenna array further includes the combiner. The combiner is configured to superpose signals received by all the antenna array elements, to obtain one aggregated signal. When the antenna array is not only configured to transmit a signal but also configured to receive a signal, the phase adjustment system for an antenna array includes not only the power splitter but also the combiner. The power splitter is in a working state when the antenna array is configured to transmit a signal. The combiner is in a working state when the antenna array is configured to receive a signal.

Figure 3:
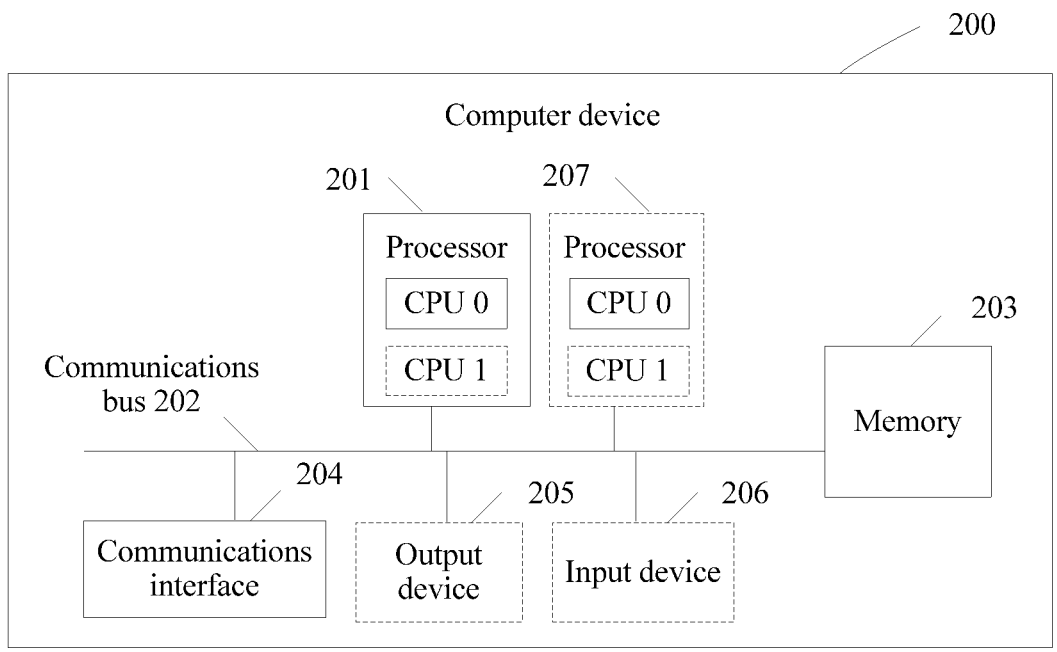
FIG. 3 is a schematic structural diagram of a computer device according to an embodiment of the present invention.

As shown in FIG. 3, the signal processing device 101 may be implemented using a general-purpose computer device 200 shown in FIG. 3.

FIG. 3 is a schematic diagram of a computer device according to an embodiment of the present invention. The computer device 200 includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits configured to control execution of a program of the solutions of the present invention.

The communications bus 202 may include a channel used to transfer information between the foregoing components. The communications interface 204 is configured to use any apparatus such as a transceiver to communicate with another device or a communications network, such as Ethernet, a radio access network (RAN), or a wireless local area network (WLAN).

The memory 203 may be a read-only memory (ROM), another type of static storage device that can store static information and an instruction, a random access memory (RAM), or another type of dynamic storage device that can store information and an instruction, or may be an electrically erasable programmable read-only memory (EEPROM), a compact disc read-only memory (CD-ROM), another optical disk storage, optical disc storage (including a compact disc, a laser disc, an optical disc, a digital versatile disc, a Blu-ray disc, and the like), a disk storage medium, another magnetic storage device, or any other medium that can be used to carry or store expected program code in a form of an instruction or a data structure and that can be accessed by a computer. However, this is not limited thereto. The memory may exist independently and is connected to the processor by using the bus. Alternatively, the memory may be integrated with the processor.

The memory 203 is configured to store application program code for executing the solutions of the present invention, and the application program code is controlled and executed by the processor 201. The processor 201 is configured to execute the application program code stored in the memory 203.

In specific implementation, in an embodiment, the processor 201 may include one or more CPUs, such as a CPU 0 and a CPU 1 in FIG. 3.

In specific implementation, in an embodiment, the computer device 200 may include a plurality of processors, such as the processor 201 and a processor 207 in FIG. 3. Each of the processors may be a single-core (single-core CPU) processor, or may be a multi-core (multi-core CPU) processor. The processor herein may be one or more devices, a circuit, and/or a processing core configured to process data (for example, a computer program instruction).

In specific implementation, in an embodiment, the computer device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, a projector, or the like. The input device 206 communicates with the processor 201, and may receive input of a user in a plurality of manners. For example, the input device 206 may be a mouse, a keyboard, a touchscreen device, a sensing device, or the like.

The computer device 200 may be a general-purpose computer device or a dedicated computer device. In specific implementation, the computer device 200 may be a desktop computer, a portable computer, a network server, a personal digital assistant (PDA), a mobile phone, a tablet computer, a wireless terminal device, a communications device, an embedded device, or a device having a structure similar to that in FIG. 3. A type of the computer device 200 is not limited in this embodiment of the present invention.

The signal processing device 101 in FIG. 2 may be the device shown in FIG. 3. A memory of the signal processing device 101 stores one or more software modules. The signal processing device 101 may implement the software module by using a processor and program code in the memory, so as to determine, when some or all of the antenna array elements in the antenna array are activated, a to-be-adjusted phase value corresponding to each antenna array element.

Figure 4:
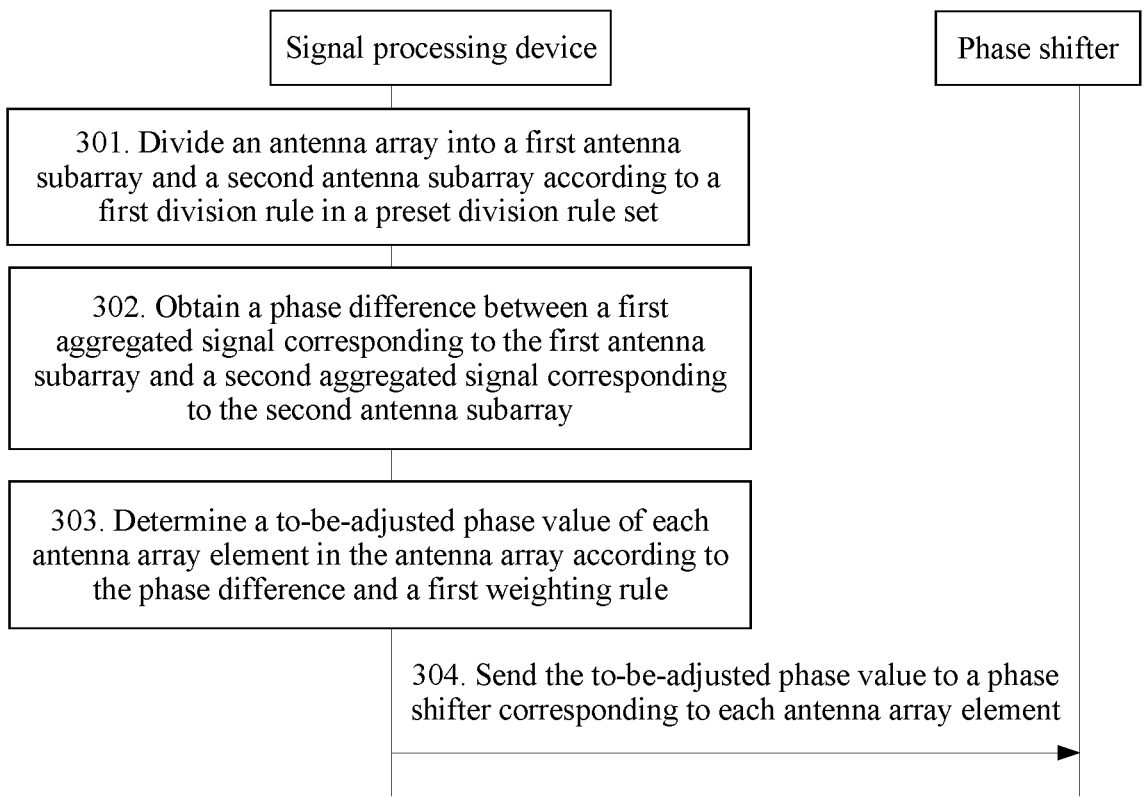
FIG. 4 is a schematic flowchart of a phase adjustment method for an antenna array according to an embodiment of the present invention.

As shown in FIG. 4, an embodiment of the present invention provides a phase adjustment method for an antenna array. The method may be applied to the phase adjustment system for an antenna array shown in FIG. 2. In FIG. 2, interaction between the signal processing device 101 and the phase shifter 103 or an external network element may be performed by using the method in the method embodiment. The method includes the following steps.

301. A signal processing device divides the antenna array into a first antenna subarray and a second antenna subarray according to a first division rule in a preset division rule set.

The preset division rule set includes at least M−1 division rules, and a value of M is a quantity of antenna array elements in the antenna array. The first division rule mentioned in this step is any one of the M−1 division rules.

When division is performed, any antenna array element in the antenna array belongs to the first antenna subarray or the second antenna subarray, and cannot simultaneously exist in the two subarrays. In addition, each of the first antenna subarray and the second antenna subarray includes at least one antenna array element.

302. The signal processing device obtains a phase difference between a first aggregated signal corresponding to the first antenna subarray and a second aggregated signal corresponding to the second antenna subarray.

Optionally, when the antenna array is configured to transmit a signal, the first aggregated signal is a signal obtained by superposing signals that are transmitted by antenna array elements in the first antenna subarray and that are propagated through spatial channels, and the second aggregated signal is a signal obtained by superposing signals that are transmitted by antenna array elements in the second antenna subarray and that are propagated through spatial channels. In actual application, in a process of being propagated through spatial channels, signals transmitted by any antenna array that includes a plurality of antenna array elements are spontaneously coherently combined. The first aggregated signal and the second aggregated signal mentioned in this step are respectively a coherently combined signal corresponding to the first antenna subarray and that corresponding to the second antenna subarray.

Optionally, when the antenna array is configured to receive a signal, the first aggregated signal is a signal obtained by superposing signals received by antenna array elements in the first antenna subarray, and the second aggregated signal is a signal obtained by superposing signals received by antenna array elements in the second antenna subarray.

It should be noted that the first aggregated signal and the second aggregated signal may be simultaneously obtained, or may be separately obtained. However, in a same adjustment process, if the antenna array is applied to a transmit end, a receive end selects a same antenna array element or a same antenna array to obtain the first aggregated signal and the second aggregated signal. In other words, in an adjustment process, configuration of the receive end remains unchanged when the first aggregated signal and the second aggregated signal are obtained. Likewise, if the antenna array is applied to a receive end, in a process of obtaining the first aggregated signal and the second aggregated signal, a transmit end selects a same antenna array element or a same antenna array to transmit a signal. In other words, configuration of the transmit end remains unchanged. For a specific process of obtaining the first aggregated signal and the second aggregated signal, refer to a detailed description below.

It should be further noted that, when the antenna array is configured to transmit a signal, signals transmitted by all antenna array elements in the first antenna subarray are same signals (which are referred to as a first transmitted signal for ease of description), and signals transmitted by all antenna array elements in the second antenna subarray are same signals (which may be referred to as a second transmitted signal for ease of description). However, a transmitted signal of the first antenna subarray and that of the second antenna subarray, that is, the first transmitted signal and the second transmitted signal, may be the same or different.

Likewise, when the antenna array is configured to receive a signal, signals received by all the antenna array elements in the first antenna subarray are same signals (which may be referred to as a first received signal for ease of description), and signals received by all the antenna array elements in the second antenna subarray are same signals (which may be referred to as a second received signal for ease of description). However, the first received signal and the second received signal may be the same or different.

In an implementation of this step, if the first aggregated signal and the second aggregated signal are separately obtained, after the first aggregated signal is obtained, a phase of the first aggregated signal relative to a reference time of a wireless communications system may be obtained through estimation according to an algorithm in the prior art, and be referred to as a phase of the first aggregated signal. Likewise, after the second aggregated signal is obtained, a phase of the second aggregated signal relative to the reference time of the same wireless communications system may be obtained through estimation according to the algorithm in the prior art, and be referred to as a phase of the second aggregated signal. Then, the phase difference is obtained according to the phase of the first aggregated signal and the phase of the second aggregated signal.

In another implementation of this step, after the first aggregated signal and the second aggregated signal are simultaneously obtained, a difference between the two signals is obtained according to the two signals, and then the phase difference is obtained according to the difference.

303. The signal processing device determines a to-be-adjusted phase value of each antenna array element in the antenna array according to the phase difference and a first weighting rule.

The first weighting rule is in a preset weighting rule set. The preset weighting rule set includes at least M−1 weighting rules. Each division rule corresponds to one weighting rule. Once a division rule is selected, a weighting rule is correspondingly determined. Specifically, the weighting rule is used to determine specific antenna array elements on which phase adjustments need to be performed and a relationship between the phase difference and a to-be-adjusted phase value corresponding to an antenna array element on which an adjustment needs to be performed, for example, the to-be-adjusted phase value is n times as large as the phase difference.

304. The signal processing device sends the to-be-adjusted phase value to a phase shifter corresponding to each antenna array element.

After receiving the to-be-adjusted phase value sent by the signal processing device, the phase shifter performs some configuration operations according to the to-be-adjusted phase value to adjust a phase value. For the process, refer to the prior art.

According to the phase adjustment method provided in this embodiment of the present invention, an entire antenna array is divided into two antenna subarrays according to a specific division rule, a phase difference between aggregated signals corresponding to the two antenna subarrays is obtained, and then a to-be-adjusted phase value for a phase shifter corresponding to each antenna array element is determined according to the obtained phase difference and a weighting rule corresponding to the division rule, and is sent to the phase shifter corresponding to each antenna array element to implement a phase adjustment. In comparison with the current method, according to the phase adjustment method provided in this embodiment of the present invention, in a whole phase adjustment process, all antenna array elements in the antenna array can be in an active state, and the antenna array can normally work, so that working efficiency of the antenna array can be improved.

Then, when the currently used phase adjustment method in which adjustments are performed on antenna array elements one by one is used, in a phase estimation process, because only a single antenna array element is in an active state, a signal-to-noise ratio of an estimation link is low, and the following problem exists. A signal received by the single antenna array element is relatively weak, and accordingly phase estimation precision is relatively low when the received signal is used to perform phase estimation. In this application, some or all antenna array elements in the antenna array are in an active state, so that a relatively high coherent combination degree can be ensured in a phase estimation process, and a signal-to-noise ratio of an estimation link can be improved, so as to improve phase estimation precision.

In addition, when the current phase adjustment method in which adjustments are performed on antenna array elements one by one is used, time overheads of completing a round of phase alignment are in direct proportion to an antenna array size. In a case of a relatively large array, time overheads of alignment are extremely high. The method is unsuitable to dynamically correct a phase deviation online. In this application, each time a phase adjustment is performed, phase estimation needs to be performed only on the two subarrays rather than on all antenna array elements one by one, so that estimation complexity is greatly reduced. This application is suitable to correct a dynamic phase change in real time.

It should be noted that actions performed by the signal processing device may be performed by the computer device shown in FIG. 3 according to the software program in the aforementioned memory.

To supplement or describe the method shown in FIG. 4, in a specific implementation process of step 302, when the antenna array is configured to transmit a signal, the first aggregated signal and the second aggregated signal may be obtained in the following implementations. The first aggregated signal is used as an example. In an implementation of obtaining the first aggregated signal, a single antenna array element is disposed at the receive end, the first antenna subarray is used as the transmit end, signals are transmitted by using the first antenna subarray, and the signals received by the single antenna array element are obtained to obtain the first aggregated signal. Settings of the receive end remain unchanged, the second antenna array is used as the transmit end, signals are transmitted using the second antenna subarray, and the signals received by the single antenna array element at the receive end are also obtained to obtain the second aggregated signal.

Evolved from the foregoing implementation, another implementation of obtaining the first aggregated signal is as follows. An antenna array including a plurality of antenna array elements is disposed at the receive end, the first antenna subarray is used as the transmit end, signals are transmitted using the first antenna subarray, and the signals received by any antenna array element at the receive end are obtained to obtain the first aggregated signal. Settings of the receive end remain unchanged, the second antenna subarray is used as the transmit end, signals are transmitted by using the second antenna subarray, and the signals received by the same antenna array element at the receive end are also obtained to obtain the second aggregated signal.

In still another implementation of obtaining the first aggregated signal, an antenna array including a plurality of antenna array elements is disposed at the receive end, the first antenna subarray is used as the transmit end, signals are transmitted using the first antenna subarray, and a signal obtained by combining, by a combiner, a plurality of signals received by the antenna array at the receive end is obtained to obtain the first aggregated signal. Settings of the receive end remain unchanged, the second antenna subarray is used as the transmit end, signals are transmitted by using the second antenna subarray, and a signal obtained by combining, by the combiner, a plurality of signals received by the antenna array at the receive end is also obtained to obtain the second aggregated signal.

It should be noted that, if the first aggregated signal and the second aggregated signal are simultaneously obtained, antenna array elements in the first antenna subarray and those in the second antenna subarray are simultaneously activated. If the first aggregated signal and the second aggregated signal are separately obtained, only the first antenna subarray is activated when the first aggregated signal is obtained, and only the second antenna subarray is activated when the second aggregated signal is obtained.

In conclusion, the receive end may have a plurality of implementations provided that in a same phase adjustment process, when the first aggregated signal and the second aggregated signal are obtained, the settings of the receive end remain unchanged, and selected antenna array elements configured to receive signals are the same.

Likewise, when the antenna array is configured to receive a signal, the first aggregated signal and the second aggregated signal may be obtained in the following implementations. The first aggregated signal is used as an example. In an implementation of obtaining the first aggregated signal, a single antenna array element is disposed at the transmit end, the first antenna subarray is used as the receive end, a signal is transmitted by using the single antenna array element at the transmit end, and a signal obtained by combining a plurality of signals received by the first antenna subarray is obtained to obtain the first aggregated signal. Settings of the transmit end remain unchanged, the second antenna subarray is used as the receive end, a signal is transmitted by using the single antenna array element at the transmit end, and a signal obtained by combining a plurality of signals received by the second antenna subarray is obtained to obtain the second aggregated signal.

Evolved from the foregoing implementation, another implementation of obtaining the first aggregated signal is as follows. An antenna array including a plurality of antenna array elements is disposed at the transmit end, the first antenna subarray is used as the receive end, a signal is transmitted by using any antenna array element in the antenna array at the transmit end, and a signal obtained by combining, by a combiner, a plurality of signals received by the first antenna subarray is obtained to obtain the first aggregated signal. Settings of the transmit end remain unchanged, the second antenna subarray is used as the receive end, a signal is transmitted by using the same antenna array element at the transmit end, and a signal obtained by combining, by the combiner, a plurality of signals received by the second antenna subarray is also obtained to obtain the second aggregated signal.

In still another implementation of obtaining the first aggregated signal, an antenna array including a plurality of antenna array elements is disposed at the transmit end, the first antenna subarray is used as the receive end, signals are transmitted using the antenna array at the transmit end, and a signal obtained by combining, by a combiner, a plurality of signals received by the first antenna subarray is obtained to obtain the first aggregated signal. Settings of the transmit end remain unchanged, the second antenna subarray is used as the receive end, signals are transmitted by using the antenna array at the transmit end, and a signal obtained by combining, by the combiner, a plurality of signals received by the second antenna subarray is also obtained to obtain the second aggregated signal.

It should be noted that, if the first aggregated signal and the second aggregated signal are simultaneously obtained, antenna array elements in the first antenna subarray and those in the second antenna subarray are simultaneously activated. If the first aggregated signal and the second aggregated signal are separately obtained, only the first antenna subarray is activated when the first aggregated signal is obtained, and only the second antenna subarray is activated when the second aggregated signal is obtained.

In conclusion, the transmit end may have a plurality of implementations provided that in a same phase adjustment process, when the first aggregated signal and the second aggregated signal are obtained, the settings of the transmit end remain unchanged, and selected antenna array elements configured to transmit signals are the same.

In actual application, phase alignment may not be implemented by performing only one phase adjustment on the antenna array, and a next phase adjustment may still need to be performed. Therefore, the following provides two implementations of determining whether a next phase adjustment needs to be performed.

To describe or supplement the method shown in FIG. 4, in an implementation, after step 304 in which the signal processing device sends the to-be-adjusted phase value to a phase shifter corresponding to each antenna array element, the method further includes: separately obtaining, by the signal processing device, signal power corresponding to the antenna array before a phase adjustment and signal power corresponding to the antenna array after the phase adjustment; determining a signal power difference according to the signal power corresponding to the antenna array after the phase adjustment and the signal power corresponding to the antenna array before the phase adjustment; and if the signal power difference is greater than a preset threshold, going back to step 301, and repeatedly performing step 301 to step 304, so as to perform a next phase adjustment on the antenna array element in the antenna array. In this implementation, after one phase adjustment, a signal power increased value corresponding to the antenna array is obtained, that is, the difference between the signal power corresponding to the antenna array after the phase adjustment and the signal power corresponding to the antenna array before the phase adjustment. If the increased value is less than the preset threshold, it may be considered that an effect brought by performing a phase adjustment again is relatively small, and there is no need to perform an adjustment again. Otherwise, if the increased value is not less than the preset threshold, it may be considered that the next phase adjustment may be performed to further increase the signal power corresponding to the antenna array, to implement phase alignment.

In this implementation, when the antenna array is configured to transmit a signal, the obtaining signal power corresponding to the antenna array includes: activating all antenna array elements in the antenna array before the phase adjustment; transmitting signals by using the antenna array; and obtaining signal power of an aggregated signal obtained by superposing the signals that are transmitted by the antenna array and that are propagated through spatial channels. After the phase adjustment, the signal power corresponding to the antenna array may be obtained in the same manner.

When the antenna array is configured to receive a signal, signal power of an aggregated signal obtained by superposing signals received by all the antenna array elements in the antenna array is obtained.

It should be noted that when the next phase adjustment is performed on the antenna array element in the antenna array, a selected division rule may be the same as or different from the previous division rule. When the two selected division rules are different, an effect on the phase adjustment is more obvious.

In another implementation, after step 304 in which the signal processing device sends the to-be-adjusted phase value to a phase shifter corresponding to each antenna array element, the method further includes: counting a quantity of adjustments to obtain a counting result; and if the counting result does not reach a preset threshold, going back to step 301, and repeatedly performing step 301 to step 304, so as to perform a next phase adjustment on the antenna array element in the antenna array. In this implementation, a threshold that is of the quantity of adjustments and that is used to determine whether phase alignment is implemented may be predetermined, and whether the next phase adjustment needs to be performed is determined by determining whether the quantity of adjustments reaches the preset threshold of the quantity of adjustments.

To supplement or describe the method, the following provides a possible implementation of the preset division rule set.

Figure 5:
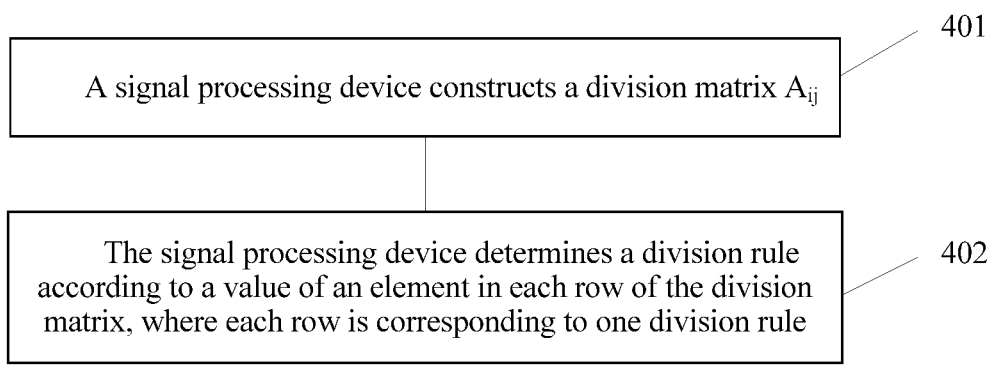
FIG. 5 is a schematic flowchart of a method for defining a preset rule according to an embodiment of the present invention.

As shown in FIG. 5, before the dividing the antenna array into a first antenna subarray and a second antenna subarray according to a first division rule in a preset division rule set, the method further includes the following steps.

401. The signal processing device constructs a division matrix $A_{ij}$.

The division matrix includes at least M−1 rows and M columns. A value of an element in each row of the division matrix is a first value or a second value. There is a preset correspondence between each antenna array element and the element in each row of the division matrix.

402. The signal processing device determines a division rule according to a value of an element in each row of the division matrix, where each row is corresponding to one division rule.

The division rule is that an antenna array element corresponding to an element whose value is the first value is grouped into the first antenna subarray, and that an antenna array element corresponding to an element whose value is the second value is grouped into the second antenna subarray.

In a specific implementation of the preset division rule set, the division matrix $A_{ij}$ is a full rank matrix that includes M−1 rows and M columns and whose element value is merely 0 or 1. Antenna array elements in the antenna array are sequentially numbered. In this case, the preset correspondence between the antenna array element and the element in each row of the division matrix is that a preset number m of each antenna array element corresponds to a column number j of the division matrix $A_{ij}$. The division rule is that an antenna array element indicated by a number m corresponding to a column number j of an element whose value is 0 in each row is grouped into the first antenna subarray, and that an antenna array element indicated by a number m corresponding to a column number j of an element whose value is 1 in each row is grouped into the second antenna subarray.

Corresponding to the division rule, the following provides a possible implementation of the weighting rule.

Before the dividing the antenna array into a first antenna subarray and a second antenna subarray according to a first division rule in a preset division rule set, the method further includes the following steps.

Step 1: Determine a weighted difference matrix B according to the division matrix $A_{ij}$ and a complementary matrix $A_{ij}{\sim}$ of the division matrix $A_{ij}$.

In specific implementation of this step, the weighted difference matrix B is determined according to the division matrix $A_{ij}$, the complementary matrix $A_{ij}{\sim}$ of the division matrix $A_{ij}$, and a formula $B = S*A_{ij} - T*A_{ij}{\sim}$, where S is an energy normalization weighted value of the division matrix $A_{ij}$, T is an energy normalization weighted value of the complementary matrix $A_{ij}{\sim}$, and the weighted difference matrix B is a matrix with M−1 rows and M columns.

Step 2: Determine a weighted matrix $G_{ji}$ according to the weighted difference matrix B.

In specific implementation of this step, a first column of the weighted difference matrix B is deleted to obtain a residual weighted difference matrix $B_R$. The weighted matrix $G_{ji}$ is determined according to an inverse matrix $B_R{\sim}$ of the residual weighted difference matrix $B_R$, a preset vector V, and a formula $$G_{ji} = \begin{bmatrix} V \\ B_R \sim \end{bmatrix}.$$

The preset vector V is a row vector that includes M−1 elements and that is orthogonal to each column vector of the residual weighted difference matrix $B_R$. The weighted matrix $G_{ji}$ is a matrix that includes M rows and M−1 columns. A weighting rule is determined according to a value of an element in each column of the weighted matrix $G_{ji}$ and a number of the antenna array element. The weighting rule is that a product of the phase difference $\Delta P_A$ and a value of each element in each column of the matrix $G_{ji}$ is used as a to-be-adjusted phase value of an antenna array element indicated by a number m corresponding to a row number j of the element. A division rule corresponding to a $j^{th}$ row of the division matrix is corresponding to a weighting rule corresponding to a $j^{th}$ column of the weighted matrix $G_{ji}$, and a value of j is a positive integer from 1 to M−1.

It should be noted that phases of M antenna array elements are mapped into M−1 pairs of aggregated phases using the division matrix $A_{ij}$. M−1 aggregated-phase differences are converted into phase differences between the M antenna array elements using the weighted matrix $G_{ji}$ corresponding to the division matrix $A_{ij}$. When the antenna array is divided according to a division rule corresponding to a first row of the division matrix, correspondingly, a selected weighting rule is a weighting rule corresponding to a first column of the weighted matrix.

For example, the antenna array includes four antenna array elements, and a Hadamard matrix whose first row is deleted may be selected as the division matrix $A_{ij}$, as shown in the following formula (1):

$$A = \begin{bmatrix} 1 & 0 & 1 & 0 \\ 1 & 1 & 0 & 0 \\ 1 & 0 & 0 & 1 \end{bmatrix} \quad (1)$$

In this case, elements in a first row of the division matrix are 1, 0, 1, and 0, and the antenna array elements are sequentially numbered 1, 2, 3, and 4. A division rule corresponding to the row is that the antenna array element 1 and the antenna array element 3 belong to an antenna subarray, and that the antenna array element 2 and the antenna array element 4 belong to another antenna subarray.

Likewise, elements in a second row of the division matrix are 1, 1, 0, and 0. A division rule corresponding to the row is that the antenna array element 1 and the antenna array element 2 belong to an antenna subarray, and that the antenna array element 3 and the antenna array element 4 belong to another antenna subarray.

The weighted matrix $G_{ji}$ corresponding to the division matrix $A_{ij}$ is the following formula (2):

$$G = \begin{bmatrix} 0 & 0 & 0 \\ -1 & 0 & -1 \\ 0 & -1 & -1 \\ -1 & -1 & 0 \end{bmatrix} \quad (2)$$

In this case, elements in a first column of the weighted matrix are 0, −1, 0, and −1. A weighting rule corresponding to the column is that, each of a to-be-adjusted phase value corresponding to the antenna array element 1 and that corresponding to the antenna array element 3 is a product of a weighted value 0 and the phase difference, that is, 0; and each of a to-be-adjusted phase value corresponding to the antenna array element 2 and that corresponding to the antenna array element 4 is a product of a weighted value −1 and the phase difference (which is referred to as ΔP for ease of description), that is, −ΔP.

Likewise, elements in a second column of the weighted matrix are 0, 0, 1, and −1. A weighting rule corresponding to the column is that, each of a to-be-adjusted phase value corresponding to the antenna array element 1 and corresponding to the antenna array element 2 is 0, and each of a to-be-adjusted phase value corresponding to the antenna array element 3 and corresponding to the antenna array element 4 is −ΔP.

When the antenna array is divided according to the division rule corresponding to the first row of the division matrix, and when a weighting rule is selected, weighting processing is performed according to the weighting rule corresponding to the first column of the weighted matrix.

Figure 6:
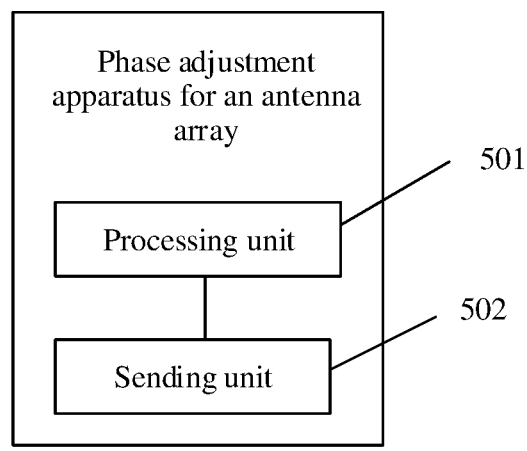
FIG. 6 is a schematic structural diagram of a phase adjustment apparatus for an antenna array according to an embodiment of the present invention.

As shown in FIG. 6, an embodiment of the present invention further provides a schematic structural diagram of a phase adjustment apparatus that is applied to a signal processing device. The signal processing device includes a processing unit 501 and a sending unit 502.

The processing unit 501 is configured to: divide the antenna array into a first antenna subarray and a second antenna subarray according to a first division rule in a preset division rule set, where the preset division rule set includes at least M−1 division rules, a value of M is a quantity of antenna array elements in the antenna array, and an antenna array element in the antenna array belongs to the first antenna subarray or the second antenna subarray. The processing unit 501 is also configured to obtain a phase difference between a first aggregated signal corresponding to the first antenna subarray and a second aggregated signal corresponding to the second antenna subarray; and determine a to-be-adjusted phase value of each antenna array element in the antenna array according to the phase difference and a first weighting rule, where the first weighting rule is a weighting rule that corresponds to the first division rule and that is in a preset weighting rule set.

The sending unit 502 is configured to send, to a phase shifter corresponding to each antenna array element, the to-be-adjusted phase value corresponding to the antenna array element.

The first aggregated signal is a signal obtained by superposing signals that are transmitted by antenna array elements in the first antenna subarray and that are propagated through spatial channels, and the second aggregated signal is a signal obtained by superposing signals that are transmitted by antenna array elements in the second antenna subarray and that are propagated through spatial channels.

Alternatively, the first aggregated signal is a signal obtained by superposing signals received by antenna array elements in the first antenna subarray, and the second aggregated signal is a signal obtained by superposing signals received by antenna array elements in the second antenna subarray.

The processing unit 501 is further configured to: separately obtain signal power corresponding to the antenna array before a phase adjustment and signal power corresponding to the antenna array after the phase adjustment; determine a signal power difference according to the signal power corresponding to the antenna array after the phase adjustment and the signal power corresponding to the antenna array before the phase adjustment; and when the signal power difference is greater than a preset threshold, perform the step of dividing the antenna array into a first antenna subarray and a second antenna subarray according to a first division rule in a preset division rule set and subsequent steps, so as to perform a next phase adjustment on the antenna array element in the antenna array.

The processing unit 501 is further configured to: count a quantity of adjustments to obtain a counting result; and if the counting result does not reach a preset threshold, perform the step of dividing the antenna array into a first antenna subarray and a second antenna subarray according to a first division rule in a preset division rule set and subsequent steps, so as to perform a next phase adjustment on the antenna array element in the antenna array.

The processing unit 501 is further configured to: construct a division matrix $A_{ij}$, where the division matrix includes at least M−1 rows and M columns, a value of an element in each row of the division matrix is a first value or a second value, and there is a preset correspondence between each antenna array element and the element in each row of the division matrix. The processing unit 501 is further configured to determine a division rule according to the value of the element in each row of the division matrix, where each row is corresponding to one division rule, and the division rule is that an antenna array element corresponding to an element whose value is the first value is grouped into the first antenna subarray, and that an antenna array element corresponding to an element whose value is the second value is grouped into the second antenna subarray.

Further, the division matrix $A_{ij}$, constructed by the processing unit 501 is a full rank matrix that includes M−1 rows and M columns and whose element value is merely 0 or 1. The preset correspondence is that a preset number m of each antenna array element is corresponding to a column number j of the division matrix $A_{ij}$. The division rule is that an antenna array element indicated by a number m corresponding to a column number j of an element whose value is 0 in each row is grouped into the first antenna subarray, and that an antenna array element indicated by a number m corresponding to a column number j of an element whose value is 1 in each row is grouped into the second antenna subarray.

The processing unit 501 is further configured to: determine a weighted difference matrix B according to the division matrix $A_{ij}$ and a complementary matrix $A_{ij}\sim$ of the division matrix $A_{ij}$; and determine a weighted matrix $G_{ij}$ according to the weighted difference matrix B.

Further, the processing unit 501 is configured to: determine the weighted difference matrix B according to the division matrix $A_{ij}$, the complementary matrix $A_{ij}\sim$ of the division matrix $A_{ij}$, and a formula $B=S*A_{ij}-T*A_{ij}\sim$, where S is an energy normalization weighted value of the division matrix $A_{ij}$, T is an energy normalization weighted value of the complementary matrix $A_{ij}\sim$, and the weighted difference matrix B is a matrix with M−1 rows and M columns. The processing unit 501 is further configured to delete a first column of the weighted difference matrix B to obtain a residual weighted difference matrix $B_R$. The processing unit 501 is further configured to determine the weighted matrix $G_{ji}$ according to an inverse matrix $B_R\sim$ of the residual weighted difference matrix $B_R$, a preset vector V, and a formula $$G_{ji} = \begin{bmatrix} V \\ B_R \sim \end{bmatrix},$$

where the preset vector V is a row vector that includes M−1 elements and that is orthogonal to each column vector of the residual weighted difference matrix $B_R$, and the weighted matrix $G_{ji}$ is a matrix that includes M rows and M−1 columns. The processing unit 501 is further configured to determine a weighting rule according to a value of an element in each column of the weighted matrix $G_{ji}$ and a number of the antenna array element, where the weighting rule is that a product of the phase difference $\Delta P_A$ and a value of each element in each column of the matrix $G_{ji}$ is used as a to-be-adjusted phase value of an antenna array element indicated by a number m corresponding to a row number j of the element.

A division rule corresponding to a $j^{th}$ row of the division matrix is corresponding to a weighting rule corresponding to a $j^{th}$ column of the weighted matrix $G_{ji}$, and a value of j is a positive integer from 1 to M−1.

Further, the processing unit 501 is configured to: activate all antenna array elements in the antenna array; transmit signals by using the antenna array; and obtain signal power of an aggregated signal obtained by superposing the signals that are transmitted by the antenna array and that are propagated through spatial channels; or obtain signal power of an aggregated signal obtained by superposing signals received by all the antenna array elements in the antenna array.

In the embodiments, the signal processing device 101 is presented in a form of a functional unit. The "unit" herein may be an application-specific integrated circuit (ASIC), a circuit, a processor and a memory that execute one or more software or firmware programs, an integrated logic circuit, and/or another device that can provide the foregoing functions. In a simple embodiment, persons skilled in the art may figure out that the signal processing device 101 may be in a form shown in FIG. 3. The processing unit 501 and the sending unit 502 may be implemented by using the processor and the memory in FIG. 3.

An embodiment of the present invention further provides a computer storage medium, configured to store a computer software instruction used by the signal processing device shown in FIG. 6, and the computer software instruction includes a program designed to perform the method embodiment. When some or all antenna array elements in an antenna array are activated, a phase of the antenna array can be adjusted by executing the stored program.

Although the present invention is described with reference to the embodiments, in a process of implementing the present invention that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another distribution form, such as by using the Internet or another wired or wireless telecommunications system.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, obviously, various modifications and combinations may be made to them without departing from the spirit and scope of the present invention. Correspondingly, this specification and the accompanying drawings are merely example descriptions of the present invention defined by the accompanying claims, and are considered as any of or all modifications, variations, combinations or equivalents that cover the scope of the present invention.

Based on the foregoing descriptions of the implementations, persons skilled in the art may clearly understand that the present invention may be implemented by software in addition to necessary universal hardware or by hardware only. Based on such an understanding, the technical solutions of the present invention essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in the embodiments of the present invention.

The foregoing descriptions are merely specific implementations of the present invention, but are not intended to limit the protection scope of the present invention. Any variation or replacement readily figured out by persons skilled in the art within the technical scope disclosed in the present invention shall fall within the protection scope of the present invention.

What is claimed is:

1. A method, comprising:
    dividing an antenna array into a first antenna subarray and a second antenna subarray according to a first division rule in a preset division rule set, wherein the preset division rule set comprises at least M−1 division rules, M is a quantity of antenna array elements in the antenna array, M is greater than or equal to three, and each antenna array element in the antenna array belongs to the first antenna subarray or the second antenna subarray;
    obtaining a phase difference between a first aggregated signal corresponding to the first antenna subarray and a second aggregated signal corresponding to the second antenna subarray;
    determining a to-be-adjusted phase value of each antenna array element in the antenna array according to the phase difference and a first weighting rule, wherein the first weighting rule corresponds to the first division rule and is in a preset weighting rule set; and
    respectively sending each to-be-adjusted phase value to a respective phase shifter corresponding to the respective antenna array element to which the respective to-be-adjusted phase value corresponds;
    wherein the first aggregated signal is obtained by superposing signals that are transmitted by antenna array elements in the first antenna subarray and that are propagated through spatial channels, and the second aggregated signal is obtained by superposing signals that are transmitted by antenna array elements in the second antenna subarray and that are propagated through spatial channels; or the first aggregated signal is obtained by superposing signals received by antenna array elements in the first antenna subarray, and the second aggregated signal is obtained by superposing signals received by antenna array elements in the second antenna subarray.

2. The method according to claim 1, wherein after respectively sending each to-be-adjusted phase value to the respective phase shifter corresponding to the respective antenna array element to which the respective to-be-adjusted phase value corresponds, the method further comprises:
    separately obtaining a first signal power and a second signal power, wherein the first signal power corresponds to the antenna array before a phase adjustment, and the second signal power corresponds to the antenna array after the phase adjustment;
    determining a signal power difference according to the first signal power and the second signal power; and
    when the signal power difference is greater than a preset threshold, performing a next phase adjustment on each antenna array element in the antenna array.

3. The method according to claim 1, wherein after respectively sending each to-be-adjusted phase value to the respective phase shifter corresponding to the respective antenna array element to which the respective to-be-adjusted phase value corresponds, the method further comprises:
    counting a quantity of adjustments to obtain a counting result; and
    when the counting result does not reach a preset threshold, performing a next phase adjustment on each antenna array element in the antenna array.

4. The method according to claim 1, wherein before dividing the antenna array into the first antenna subarray and the second antenna subarray according to the first division rule in the preset division rule set, the method further comprises:
    constructing a division matrix $A_{ij}$, wherein the division matrix comprises at least M−1 rows and M columns, a value of an element in each row of the division matrix is a first value or a second value, and there is a preset correspondence between each antenna array element and the element in each row of the division matrix; and
    determining a division rule according to the value of the element in each row of the division matrix, wherein each row corresponds to one division rule, and the division rule comprises an antenna array element corresponding to an element whose value is the first value being grouped into the first antenna subarray, and an antenna array element corresponding to an element whose value is the second value being grouped into the second antenna subarray.

5. The method according to claim 4, wherein the division matrix $A_{ij}$ is a full rank matrix that comprises M−1 rows and M columns, an element value of each element in the division matrix is 0 or 1, the preset correspondence comprising a preset number m of each antenna array element corresponding to a column number j of the division matrix $A_{ij}$, and the division rule comprises an antenna array element indicated by a number m corresponding to a column number j of an element whose value is 0 in each row being grouped into the first antenna subarray, and an antenna array element indicated by a number m corresponding to a column number j of an element whose value is 1 in each row being grouped into the second antenna subarray.

6. The method according to claim 4, wherein before dividing the antenna array into the first antenna subarray and the second antenna subarray according to the first division rule in the preset division rule set, the method further comprises:
determining a weighted difference matrix B according to the division matrix $A_{ij}$ and a complementary matrix $A_{ij}\sim$ of the division matrix $A_{ij}$; and
determining a weighted matrix $G_{ji}$ according to the weighted difference matrix B.

7. The method according to claim 6, wherein determining the weighted difference matrix B according to the division matrix $A_{ij}$ and the complementary matrix $A_{ij}\sim$ of the division matrix $A_{ij}$ comprises:
determining the weighted difference matrix B according to the division matrix $A_{ij}$, the complementary matrix $A_{ij}\sim$ of the division matrix $A_{ij}$, and a relation $B=S*A_{ij}-T*A_{ij}\sim$, wherein S is an energy normalization weighted value of the division matrix $A_{ij}$, T is an energy normalization weighted value of the complementary matrix $A_{ij}\sim$, and the weighted difference matrix B comprises M−1 rows and M columns; and
wherein determining a weighted matrix $G_{ji}$ according to the weighted difference matrix B comprises:
deleting a first column of the weighted difference matrix B to obtain a residual weighted difference matrix $B_R$;
determining the weighted matrix $G_{ji}$ according to an inverse matrix $B_R\sim$ of the residual weighted difference matrix $B_R$, a preset vector V, and a relation $$G_{ji} = \begin{bmatrix} V \\ B_R \sim \end{bmatrix},$$

wherein the preset vector V is a row vector that comprises M−1 elements and that is orthogonal to each column vector of the residual weighted difference matrix $B_R$, and the weighted matrix $G_{ji}$ is a matrix that comprises M rows and M−1 columns; and
determining a weighting rule according to a value of an element in each column of the weighted matrix $G_{ji}$ and a number of the antenna array element, wherein the weighting rule is that a product of the phase difference and a value of each element in each column of the matrix $G_{ji}$ is used as a to-be-adjusted phase value of an antenna array element indicated by a number m corresponding to a row number j of the element;
wherein a division rule corresponding to a $j^{th}$ row of the division matrix corresponds to a weighting rule corresponding to a $j^{th}$ column of the weighted matrix $G_{ji}$, and a value of j is a positive integer from 1 to M−1.

8. An apparatus, comprising:
computing hardware; and
a non-transitory computer-readable storage medium including computer-executable instructions, wherein the computing hardware is configured to execute the instructions to:
divide an antenna array into a first antenna subarray and a second antenna subarray according to a first division rule in a preset division rule set, wherein the preset division rule set comprises at least M−1 division rules, M is a quantity of antenna array elements in the antenna array, M is greater than or equal to three, and each antenna array element in the antenna array belongs to the first antenna subarray or the second antenna subarray;
obtain a phase difference between a first aggregated signal corresponding to the first antenna subarray and a second aggregated signal corresponding to the second antenna subarray; and
determine a to-be-adjusted phase value of each antenna array element in the antenna array according to the phase difference and a first weighting rule, wherein the first weighting rule is a weighting rule that is corresponding to the first division rule and that is in a preset weighting rule set; and
respectively send each to-be-adjusted phase value to a respective phase shifter corresponding to the respective antenna array element to which the respective to-be-adjusted phase value corresponds;
wherein the first aggregated signal is obtained by superposing signals that are transmitted by antenna array elements in the first antenna subarray and that are propagated through spatial channels, and the second aggregated signal is obtained by superposing signals that are transmitted by antenna array elements in the second antenna subarray and that are propagated through spatial channels; or the first aggregated signal is obtained by superposing signals received by antenna array elements in the first antenna subarray, and the second aggregated signal is obtained by superposing signals received by antenna array elements in the second antenna subarray.

9. The apparatus according to claim 8, wherein the computing hardware is configured to further execute the instructions to:
separately obtain a first signal power and a second signal power, wherein the first signal power corresponds to the antenna array before a phase adjustment, and the second signal power corresponds to the antenna array after the phase adjustment;
determining a signal power difference according to the first signal power and the second signal power; and
when the signal power difference is greater than a preset threshold, performing a next phase adjustment on each antenna array element in the antenna array.

10. The apparatus according to claim 8, wherein the computing hardware is configured to further execute the instructions to:
count a quantity of adjustments to obtain a counting result; and
when the counting result does not reach a preset threshold, performing a next phase adjustment on each antenna array element in the antenna array.

11. The apparatus according to any one of claim 8, wherein the computing hardware is configured to further execute the instructions to:
construct a division matrix $A_{ij}$, wherein the division matrix comprises at least M−1 rows and M columns, a value of an element in each row of the division matrix is a first value or a second value, and there is a preset correspondence between each antenna array element and the element in each row of the division matrix; and
determine a division rule according to the value of the element in each row of the division matrix, wherein each row corresponds to one division rule, and the division rule comprises an antenna array element corresponding to an element whose value is the first value being grouped into the first antenna subarray, and an antenna array element corresponding to an element whose value is the second value being grouped into the second antenna subarray.

12. The apparatus according to claim 11, wherein the division matrix $A_{ij}$ is a full rank matrix that comprises M−1 rows and M columns, a value of each element in the division matrix is 0 or 1, the preset correspondence comprises a preset number m of each antenna array element corresponding to a column number j of the division matrix $A_{ij}$, and the division rule comprises an antenna array element indicated by a number m corresponding to a column number j of an element whose value is 0 in each row being grouped into the first antenna subarray, and an antenna array element indicated by a number m corresponding to a column number j of an element whose value is 1 in each row being grouped into the second antenna subarray.

13. The apparatus according to claim 12, wherein the computing hardware is configured to further execute the instructions to:
   determine a weighted difference matrix B according to the division matrix $A_{ij}$ and a complementary matrix $A_{ij}$~ of the division matrix $A_{ij}$; and
   determine a weighted matrix $G_{ji}$ according to the weighted difference matrix B.

14. The apparatus according to claim 13, wherein the computing hardware is configured to further execute the instructions to:
   determine the weighted difference matrix B according to the division matrix $A_{ij}$, the complementary matrix $A_{ij}$~ of the division matrix $A_{ij}$, and a relation B=S*$A_{ij}$−T*$A_{ij}$~, wherein S is an energy normalization weighted value of the division matrix $A_{ij}$, T is an energy normalization weighted value of the complementary matrix $A_{ij}$~, and the weighted difference matrix B comprises M−1 rows and M columns;
   delete a first column of the weighted difference matrix B to obtain a residual weighted difference matrix $B_R$;
   determine the weighted matrix $G_{ji}$ according to an inverse matrix $B_R$~ of the residual weighted difference matrix $B_R$, a preset vector V, and a formula $$G_{ji} = \begin{bmatrix} V \\ B_R \sim \end{bmatrix},$$

wherein the preset vector V is a row vector that comprises M−1 elements and that is orthogonal to each column vector of the residual weighted difference matrix $B_R$, and the weighted matrix $G_{ji}$ comprises M rows and M−1 columns; and
   determine a weighting rule according to a value of an element in each column of the weighted matrix $G_{ji}$ and a number of the antenna array element, wherein the weighting rule is that a product of the phase difference and a value of each element in each column of the matrix $G_{ji}$ is used as a to-be-adjusted phase value of an antenna array element indicated by a number m corresponding to a row number j of the element;
   wherein a division rule corresponding to a $j^{th}$ row of the division matrix corresponds to a weighting rule corresponding to a $j^{th}$ column of the weighted matrix $G_{ji}$, and a value of j is a positive integer from 1 to M−1.

15. An apparatus, comprising:
   a processor, configured to:
      divide an antenna array into a first antenna subarray and a second antenna subarray according to a first division rule in a preset division rule set, wherein the preset division rule set comprises at least M−1 division rules, M is a quantity of antenna array elements in the antenna array, M is greater than or equal to three, and each antenna array element in the antenna array belongs to the first antenna subarray or the second antenna subarray;
      obtain a phase difference between a first aggregated signal corresponding to the first antenna subarray and a second aggregated signal corresponding to the second antenna subarray;
      determine a to-be-adjusted phase value of each antenna array element in the antenna array according to the phase difference and a first weighting rule, wherein the first weighting rule is a weighting rule corresponds to the first division rule and is in a preset weighting rule set; and
      respectively send each to-be-adjusted phase value to a respective phase shifter corresponding to a respective antenna array element to which the to-be-adjusted phase value corresponds;
   wherein the first aggregated signal is obtained by superposing signals that are transmitted by antenna array elements in the first antenna subarray and that are propagated through spatial channels, and the second aggregated signal is obtained by superposing signals that are transmitted by antenna array elements in the second antenna subarray and that are propagated through spatial channels; or the first aggregated signal is obtained by superposing signals received by antenna array elements in the first antenna subarray, and the second aggregated signal is obtained by superposing signals received by antenna array elements in the second antenna subarray.

16. The apparatus according to claim 15, wherein the processor is further configured to:
   separately obtain a first signal power and a second signal power, wherein the first signal power corresponds to the antenna array before a phase adjustment, and the second signal power corresponds to the antenna array after the phase adjustment;
   determine a signal power difference according to the first signal power and the second signal power; and
   when the signal power difference is greater than a preset threshold, perform a next phase adjustment on each antenna array element in the antenna array.

17. The apparatus according to claim 15, wherein the processor is further configured to:
   count a quantity of adjustments to obtain a counting result; and
   when the counting result does not reach a preset threshold, perform a next phase adjustment on each antenna array element in the antenna array.

18. The apparatus according to any one of claim 15, wherein the processor is further configured to:
   construct a division matrix $A_{ij}$, wherein the division matrix comprises at least M−1 rows and M columns, a value of an element in each row of the division matrix is a first value or a second value, and there is a preset correspondence between each antenna array element and the element in each row of the division matrix; and
   determine a division rule according to the value of the element in each row of the division matrix, wherein each row corresponds to one division rule, and the division rule comprises an antenna array element corresponding to an element whose value is the first value being grouped into the first antenna subarray, and an antenna array element corresponding to an element whose value is the second value being grouped into the second antenna subarray.

19. The apparatus according to claim 18, wherein the division matrix $A_{ij}$ constructed by the processor is a full rank matrix that comprises M−1 rows and M columns, a value of each element is 0 or 1, the preset correspondence comprises a preset number m of each antenna array element corresponding to a column number j of the division matrix $A_{ij}$, and the division rule comprises an antenna array element indicated by a number m corresponding to a column number j of an element whose value is 0 in each row being grouped into the first antenna subarray, and an antenna array element indicated by a number m corresponding to a column number j of an element whose value is 1 in each row being grouped into the second antenna subarray.

20. The apparatus according to claim 18, wherein the processor is further configured to:
determine a weighted difference matrix B according to the division matrix $A_{ij}$ and a complementary matrix $A_{ij}\sim$ of the division matrix $A_{ij}$; and
determine a weighted matrix $G_{ji}$ according to the weighted difference matrix B.

* * * * *